April 2, 1968   J. H. KETTERING ET AL   3,376,080
EMPTY AND LOAD BRAKE CONTROL APPARATUS FOR RAILWAY CARS
Filed Sept. 30, 1966   2 Sheets-Sheet 1

INVENTOR.
JAMES H. KETTERING
FRANCIS R. RACKI
BY
*A.A. Steinmiller*
ATTORNEY

April 2, 1968     J. H. KETTERING ET AL     3,376,080
EMPTY AND LOAD BRAKE CONTROL APPARATUS FOR RAILWAY CARS
Filed Sept. 30, 1966     2 Sheets-Sheet 2

INVENTOR.
JAMES H. KETTERING
BY FRANCIS R. RACKI

*A. A. Steinmiller*

ATTORNEY

United States Patent Office 3,376,080
Patented Apr. 2, 1968

3,376,080
EMPTY AND LOAD BRAKE CONTROL APPARATUS FOR RAILWAY CARS
James H. Kettering, Irwin, and Francis R. Racki, Pittsburgh, Pa., assignors to Westinghouse Air Brake Company, Wilmerding, Pa., a corporation of Pennsylvania
Filed Sept. 30, 1966, Ser. No. 583,335
5 Claims. (Cl. 303—22)

ABSTRACT OF THE DISCLOSURE

An empty and load brake control apparatus for railway cars in which a load measuring operation is automaticaly effected each time a brake application is made to thereby cause a change in the degree of the application effected subsequent to each change in the load carried by the car.

BACKGROUND OF THE INVENTION

The empty and load brake control apparatus heretofore known for railway vehicles has usually comprised a brake control change-over valve device carried by the body of the vehicle and a load-measuring or strut cylinder device which is installed on the end of a truck bolster and connected by flexible conduits to the change-over valve device since the truck bolster constitutes a part of the vehicle truck and therefore, turns relative to the vehicle body as the vehicle travels around a curve. The initial cost of such empty and load brake control apparatus is relatively high and the maintenance cost, including that of the conduits connecting the change-over valve device and the strut cylinder device, is often prohibitive.

Furthermore, most of the heretofore known empty and load brake control apparatus for railway vehicles is automatically conditioned or changed over to provide either empty or load braking accordingly as the vehicle is empty or loaded only while the train brake pipe pressure is increasing during charging subsequent to a reduction in the pressure in the train brake pipe to substantially zero, a condition not obtained when a full or partial service application is effected but only when an emergency application is effected.

Accordingly, it is the general purpose of this invention to provide a simple and inexpensive empty and load brake apparatus in which the functions of a change-over valve device and of a load-measuring strut cylinder device are performed by a differential type of fluid pressure operated relay valve device and a load-measuring strut cylinder device each carried on a sprung part of a railway vehicle which relay valve device is conditioned to provide indirectly a pressure in a brake cylinder device in accordance with the load carried on the body.

More specifically, the invention comprises a simple and inexpensive fluid motor or load-measuring strut cylinder device that may be installed on any suitable sprung part of the vehicle such as, for example, a truck bolster substantially midway the length thereof and connected by either piping or flexible hose to a relay valve device which, in turn, is connected by piping to a conventional AB fluid pressure brake control equipment. This strut cylinder device is operated each time a brake application is effected to move a strut piston and piston rod into contact with a stop, the distance moved by the piston and piston rod varying in accordance with the load on a railway car. This distance traveled by the piston and piston rod determines whether or not fluid under pressure is supplied to one side of one diaphragm of a diaphragm stack of a differential type relay valve device or to both sides of the one and also to one side of another diaphragm of the stack to thereby effect operation of the relay valve device to a condition which, when fluid under pressure is supplied under the control of the usual AB control valve device, controls the fluid under pressure supplied to the brake cylinder device in accordance with the empty or loaded condition of the car.

The above-mentioned differential type relay valve device and strut cylinder device constituting the present invention can be added to a railway freight car presently provided with a standard single capacity brake equipment, such as the well-known AB freight brake equipment, to convert the brake equipment on the car to a double capacity empty and load freight brake equipment without adding any additional brake rigging. Moreover, it can be used to replace the more costly and complicated change-over valve device and the corresponding strut cylinder device which, together with either an empty brake cylinder device and a load brake cylinder device, or a compensating type of brake cylinder device and a control valve device, such as the well-known AB control valve device, constitute the principal elements of some of the empty and load freight brake equipments presently installed on a large number of freight cars in service on American railroads. By effecting such replacement, these cars may be provided with an upgraded empty and load brake equipment which is more simple in operation and less costly to maintain without the necessity of effecting any changes in or additions to the brake rigging presently on the freight car.

DESCRIPTION, FIGS. 1 AND 2

Figure 1:
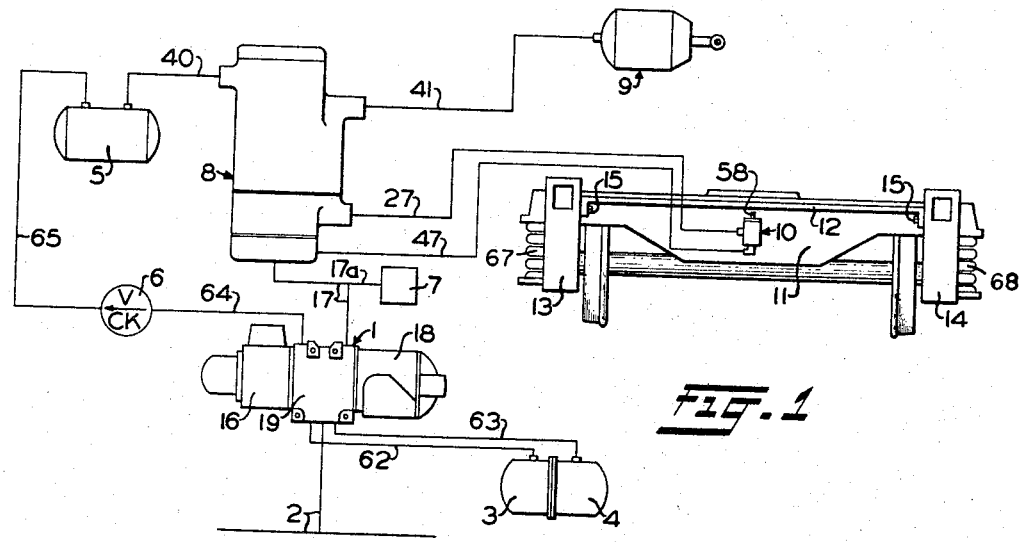
FIG. 1 is a diagrammatic view, in outline, showing an empty and load railway freight car brake equipment constructed in accordance with one embodiment of the invention.

In FIG. 1 of the drawing, there is shown an empty and load fluid pressure brake equipment constructed in accordance with one embodiment of the invention. This empty and load fluid pressure brake equipment comprises a brake control valve device 1 to which is connected the usual brake pipe 2, auxiliary reservoir 3, and emergency reservoir 4. The empty and load brake equipment shown in FIG. 1 further includes an additional supply reservoir 5 that is charged from the brake pipe 2 via the brake control valve device 1 and a one-way check valve device 6, a displacement volume reservoir 7, a double diaphragm differential type self-lapping relay valve device 8, a brake cylinder device 9 and a fluid motor or strut cylinder device 10 that is mounted by any suitable means (not shown) substantially midway the length of a truck bolster 11 that constitutes a sprung part of a freight car. It will be understood that the other above-mentioned parts of the brake equipment, as well as the strut cylinder device 10, are also mounted on a suitable sprung part of the freight car. The truck bolster 11 and strut cylinder device 10 carried thereby are movable vertically relative to a stop 12 carried on an unsprung part of a railway car. This stop 12 may be such as, for example, a rod rectangular in cross section and extending between the two side frames 13 and 14 of the car truck so as to have an angle bracket formed at each end thereof connected to a corresponding side frame by a cap screw 15.

The brake control valve device 1 shown in FIG. 1 of the drawings is of the AB type which may be of substantially the same operating characteristics as the brake control valve device fully described in Patent 2,031,213, issued Feb. 18, 1936 to Clyde C. Farmer and assigned to the assignee of the present invention, in view of which it is deemed unnecessary to show and describe this valve device in detail.

Briefly, however, the brake control valve device 1 comprises a service portion 16 adapted to operate upon both a service and an emergency rate of reduction in pressure of fluid in brake pipe 2 for supplying fluid under pressure from the auxiliary reservoir 3 to a brake cylinder pipe 17 and to the relay valve device 8 connected thereto. The relay valve device 8 is operated by the fluid under pressure thus supplied thereto, upon a service reduction in brake pipe pressure, to effect the supply of fluid under pressure from the supply reservoir 5 to the brake cylinder device 9, in a manner hereinafter described in detail, for effecting a service application of the brakes on the vehicle. The brake control valve device 1 also comprises an emergency portion 18 which is adapted to operate only upon an emergency rate of reduction in pressure of fluid in brake pipe 2 for supplying fluid under pressure from the emergency reservoir 4 to the pipe 17. This fluid under pressure thus supplied from the emergency reservoir 4 to the pipe 17, in addition to that provided in this pipe from auxiliary reservoir 3 by operation of the service portion 16, is adapted to operate the relay valve device 8 to provide a higher pressure in the brake cylinder device 9 to cause an emergency application of the brakes on the vehicle. Upon recharging the brake pipe 2, the brake control valve device 1 is adapted to operate to open the pipe 17 to atmosphere for releasing fluid under pressure therefrom to cause the relay valve device 8 to operate to release fluid under pressure from the brake cylinder device 9 thereby releasing the brakes on the vehicle and at the same time to effect the recharging of the auxiliary reservoir 3 and emergency reservoir 4 in the usual well-known manner. The service and emergency portions 16 and 18, respectively, of the brake control valve device 1 are mounted on opposite faces of a pipe bracket 19 to which all pipe connections to the valve device 1 are made, as shown in FIG. 1 of the drawings.

Figure 2:
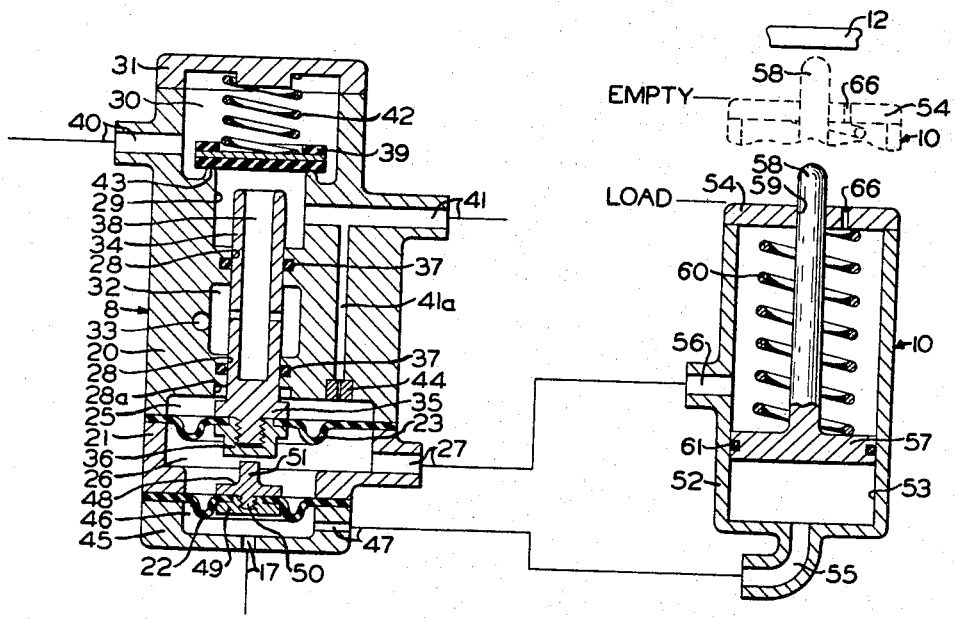
FIG. 2 is a vertical cross-sectional view, at an enlarged scale, of the novel differential type relay valve device and strut cylinder device of FIG. 1 showing the structural details of these devices.

Briefly, the double diaphragm self-lapping relay valve device 8 comprises, as shown in FIG. 2 of the drawings, sectionalized casing embodying two casing sections 20 and 21 and two coaxially arranged movable abutments or diaphragms 22 and 23 of different effective areas. The outer periphery of the larger diaphragm 23 is clamped between the casing sections 20 and 21 which are secured together by any suitable means (not shown).

The diaphragm 23 cooperates with the casing sections 20 and 21 and the diaphragm 22 to form within the relay valve device 8 and on opposite sides of the diaphragm 23, a first pair of chambers 25 and 26, the latter being connected by a passageway and corresponding pipe 27 to the strut cylinder device 10.

The casing section 20 of the above-mentioned sectionalized casing of the relay valve device 8 is provided with a bore 28 that at its upper end opens into a coaxial counterbore 29 that in turn opens into a chamber 30 formed by the cooperative relationship between the upper end of the casing section 20 and a cover member 31 secured to the casing section 20 by any suitable means (not shown). The opposite or lower end of the bore 28 opens into a second coaxial counterbore 28a that in turn opens into the chamebr 25. The casing section 20 is provided intermediate the ends of the bore 28 with an annular chamber 32 which is open to atmosphere via a passageway and port 33. Slidably mounted in the bore 28 is a valve stem 34 having intermediate its ends a collar 35 below which is a screw-threaded portion of reduced diameter which extends through the diaphragm 23 and receives in screw-threaded engagement therewith a combined diaphragm follower plate and nut 36 whereby the diaphragm 23 is operatively connected to the valve stem 34.

The wall of the bore 28 in the casing section 20 is provided with two identical spaced-apart peripheral annular grooves in each of which is disposed an O-ring 37 in sealing surrounding relation to the valve stem 34 to prevent leakage of fluid under pressure between the periphery of the valve stem and the wall of the bore 28, and from the chamber 25 and counterbore 29 to the atmospheric chamber 32.

The valve stem 34 is provided with a crossbore which, as shown in FIG. 2 illustrating the relative positions of the parts of the double diaphragm self-lapping relay valve device 8 in the brake release position, is so located that the interior of the counterbore 29 is open to atmosphere via a passageway 38 extending from the upper end of the valve stem 34 longitudinally therethrough to below the location thereon of the crossbore, the chamber 32 and the passageway and corresponding port 33.

A flat disc valve 39 is disposed in the chamber 30 which is supplied with fluid under pressure from the supply reservoir 5 via a passageway and corresponding pipe 40 connected to the reservoir 5. The valve 39 controls communication between the chamber 30 and the interior of the counterbore 29 at the wall surface of which opens one end of a passageway 41 that extends through the casing section 20 and is connected by a pipe bearing the same numeral to the brake cylinder device 9.

A spring 42, interposed between the valve 39 and the cover member 31, urges the valve 39 downward for normally seating it against an annular valve seat 43 formed at the upper end of the counterbore 29.

The above-mentioned passageway 41 has a branch passageway 41a opening into the chamber 25 via a choke 44 which controls the rate of flow of fluid under pressure to and from the chamber 25.

The outer periphery of the smaller diaphragm 22 is clamped between the casing section 21 and a bottom cover member 45 which is secured to the casing section 21 by any suitable means (not shown) and which cooperates with the diaphragm 22 to form a chamber 46 into which opens the brake cylinder passageway and corresponding pipe 17 which is connected by a branch pipe 17a (FIG 1) to the herinbefore-mentioned displacement reservoir 7. Also opening into the chamber 46 is one end of a passageway 47 which is connected by a pipe bearing the same numeral to the strut cylinder device 10 which will be hereinafter described in detail. The inner periphery of the smaller diaphragm 22 is clamped between a diaphragm follower 48 and a nut 49 that has screw-threaded engagement with a screw-threaded stem 50 integral with the follower 48 and extending from one side thereof through the diaphragm 22. The opposite side of the diaphragm 48 is provided with a non-screw-threaded stem 51 which is coaxial with the hereinbefore-mentioned valve stem 34.

The strut cylinder device 10, as shown in cross section in FIG 2, comprises a body 52 in which is provided a bottom bore 53 the open end of which is closed by a cover member 54 that is secured to the body 52 by any suitable means (not shown). Opening into the lower end of the bottom bore 53 is a passageway 55 to which one end of the hereinbefore-mentioned pipe 47 is connected, and opening at the wall surface of this bottom bore 53 intermediate the ends thereof is a second passageway 56 to which one end of the hereinbefore-mentioned pipe 27 is connected.

A strut piston 57 slidably disposed in the bottom bore 53 and having a piston rod 58 extending through a bore 59 in the cover member 54 is normally biased in the direction of the lower end of the bottom bore 53 by a spring 60 disposed in surrounding relation to the piston rod 58 and interposed between the upper face of the strut piston 57 and the cover member 54. The piston 57 is provided with a peripheral annular groove in which is disposed an O-ring 61 which, until the strut piston 57 is moved upward a chosen distance against the yielding resistance of the spring 60, prevents the flow of fluid under pressure from the lower face of the piston 57 to the passageway 56 and pipe 27.

OPERATION, FIGS. 1 AND 2

Initial charging

In initially charging the empty and load brake equipment shown in FIG 1 of the drawings, fluid under pressure supplied to the brake pipe 2 by the brake valve device (not shown) on the locomotive flows to the brake control valve device 1 and thence through this device and pipes 62 and 63 to the auxiliary and emergency reservoirs 3 and 4, respectively, to effect charging of these reservoirs in the usual well-known manner. Furthermore, fluid under pressure flows from the brake pipe 2 through the brake control valve device 1, a pipe 64, the check valve device 6 and a pipe 65 to the supply reservoir 5 to effect the charging of this reservoir.

It will be understood that at this time the brake cylinder device 9 and the various chambers in the relay valve device 8 and strut cylinder device 10 are devoid of fluid under pressure.

Service application of the brakes on an empty vehicle

When it is desired to effect a service application of the brakes, the fluid pressure in the brake pipe 2 will be reduced in the usual manner by operation of the brake valve on the locomotive to cause the brake control valve device 1 to effect the supply of fluid under pressure from the auxiliary reservoir 3 to the brake cylinder pipe 17 which is connected by the corresponding passageway to the chamber 46 in the relay valve device 8, and by the branch pipe 17a to the displacement reservoir 7. By thus connecting the displacement reservoir 7 to the chamber 46, when a brake application is effected, the same equalization pressure between the auxiliary reservoir 3, the chamber 46 and the displacement reservoir 7 is obtained as is obtained by equalization of the auxiliary reservoir pressure into the brake cylinder device in conventional single capacity brake equipment using the well-known AB control valve device.

Fluid under pressure supplied to the chamber 46 in the manner described above will flow therefrom to the lower end of the bottom bore 53 and the lower face of the strut piston 57 via passageway and corresponding pipe 47 and the passageway 55.

Fluid under pressure supplied to the lower face of the piston 57 in the manner just described is effective to move this piston and the piston rod 58 upward against the yielding resistance of the spring 60.

Assuming that the vehicle is empty, the strut cylinder device 10 will occupy, with respect to the stop 12, the position indicated by broken lines in FIG. 2. Therefore, the strut piston 57 and piston rod 58 will thus be moved upward until the upper end of the piston rod is moved into contact with the stop 12 carried by the truck side frames 13 and 14.

When the piston 57 is moved upward to the position in which the upper end of the piston rod 58 is in contact with the stop 12, the O-ring 61 carried by the piston 57 is in a position in which it forms a seal with the wall surface of the bottom bore 53 just below the opening of the passageway 56 at the wall surface of this bottom bore 53. Therefore, the fluid under pressure supplied from the brake cylinder pipe 17 to the lower face of the piston 57 via the pathway previously described cannot flow to the chamber 26 above the diaphragm 22 via the passageway 56 and the pipe and corresponding passageway 27. Consequently, the chamber 26 remains open to atmosphere via the passageway and corresponding pipe 27, passageway 56, that portion of the bottom bore 53 above the strut piston 57 and a port 66 provided in the cover member 54.

As the fluid under pressure supplied to the chamber 46 in the manner previously described increases the pressure in this chamber, the diaphragm 22 is deflected upward until the stem 51 is moved into contact with the combined diaphragm follower plate and nut 36 after which the diaghragms 22 and 23 are simultaneously deflected upward to first move the upper end of the valve stem 34 into contact with the lower side of the valve 39 to close communication between the pressure chamber (not shown) in the brake cylinder device 9 and atmosphere. As the diaphragms 22 and 23 continue to be deflected upward, subsequent to movement of the upper end of the valve stem 34 into contact with the lower side of the valve 39, this valve 39 will be moved upward away from the valve seat 43 against the yielding resistance of the spring 42.

Upon the unseating of valve 39 from the valve seat 43, fluid under pressure will flow from the supply reservoir 5 to the pressure chamber in the brake cylinder device 9 shown in FIG. 1 via pipe and passageway 40, chamber 30 (FIG. 2), past unseated valve 39, counterbore 29 and passageway and corresponding pipe 41. Consequently, the brake cylinder device 9 (FIG. 1) is effective in response to the supply of fluid under pressure to the pressure chamber thereof to effect a brake application on the vehicle.

Some of the fluid under pressure supplied to the passageway 41 (FIG. 2) in the manner described above flows to the chamber 25 above the larger diaphragm 23 via the branch passageway 41a and the choke 44. The fluid under pressure thus supplied to the chamber 25 acts on the effective area of the larger diaphragm 23 in a direction opposite to the direction that the fluid under pressure supplied to the chamber 46 acts on the effective area of the smaller diaphragm 22 so that when these oppositely acting fluid pressure forces are substantially balanced, the spring 42 will be rendered effective to move the valve 39, stem 34 and diaphragms 23 and 22 downward to seat valve 39 on the valve seat 43 to cut off flow of fluid under pressure from the supply reservoir 5 to the pressure chamber in the brake cylinder device 9. From the foregoing, it is apparent that, since the effective area of the diaphragm 23 is greater than the effective area of the diaphragm 22, the pressure supplied to the pressure chamber of the brake cylinder device 9 and to the chamber 25 is less than the pressure supplied to the chamber 46 and in inverse ratio to that of the effective areas of the larger diaphragm 23 and the smaller diaphragm 22. It will be understood, however, that this pressure in the pressure chamber of the brake cylinder device 9 provides an adequate braking force for an empty vehicle.

Release of a service application on an empty vehicle

When it is desired to effect a release of a service brake application, the pressure in the brake pipe 2 will be increased in the usual manner to cause the service slide valve (not shown) of the service portion 16 of the brake control valve device 1 to be returned to its release position so that a communication is established therethrough from the brake cylinder pipe 17 to atmosphere.

Since the brake cylinder pipe 17 is now open to atmosphere and this pipe is connected by the corresponding passageway to the chamber 46 in the relay valve device 8, and by the branch pipe 17a to the displacement volume reservoir 7, the fluid under pressure in the chamber 46, the reservoir 7, and also in the bottom bore 53 below the piston 57 which is connected to the chamber 46 via passageway 55 and passageway and pipe 47, will be vented to atmosphere.

As fluid under pressure is vented from the chamber 46, as just described, the fluid under pressure in the chamber 25 is rendered effective to deflect the diaphragms 22 and 23 downward and thereby move the valve stem 34 downward to the position shown in FIG. 2, whereupon the pressure chamber in the brake cylinder device 9 is open to atmosphere via pipe and passageway 41, counterbore 29, passageway 38 and the crossbore in the stem 34, chamber 32, and passageway and port 33 to release the fluid under pressure therefrom thereby releasing the brakes on the vehicle.

*Service application of the brake on a loaded vehicle*

Let it be supposed that the brake equipment shown in FIG. 1 has been charged in the manner hereinbefore described and that the vehicle is fully loaded.

When the vehicle is fully loaded, one half of the load is transmitted from the vehicle body to the bolster 11 of the truck at one end of the vehicle and the other half of the load is transmitted from the vehicle body to the bolster of the truck at the other end of the vehicle. The load transmitted to the bolster 11 shown in FIG. 1 is effective to compress the truck springs 67 and 68 interposed between the respective end of the truck bolster and the corresponding truck spring plank (not shown) of the respective side frame 13 and 14 so that the bolster 11 and the strut cylinder device 10 carried thereon are moved downward from the position they occupied when the vehicle was empty toward the truck spring planks a distance proportional to the load on the bolster. Consequently, the distance between the upper end of the piston rod 58 and the bottom surface of the stop 12 will increase until the strut cylinder device 10 and the upper end of the piston rod 58 thereof occupy, with respect to the stop 12, the position in which they are shown in full lines in FIG. 2 of the drawings. Therefore, when a service brake application is effected in the manner hereinbefore described and fluid under pressure is supplied to the brake cylinder pipe 17 and chamber 46 and thence to the lower face of the strut piston 57, via passageway and pipe 47, passageway 55 and the lower portion of the bottom bore 53, this piston 57 will move upward against the yielding resistance of spring 60 until it is brought to a stop by the upper end of the piston rod 58 contacting the bottom of the stop 12. In this position of the piston 57, the O-ring 61 carried thereon is disposed above the opening of the passageway 56 at the wall surface of the bottom bore 53. Consequently, the fluid under pressure supplied to the lower face of the piston 57 in the manner described above will flow to the chamber 26 above the smaller diaphragm 22 in the relay valve device 8 via the passageway 56 and pipe and corresponding passageway 27.

The simultaneous supply of fluid under pressure to the chambers 46 and 26 acts on the opposite sides of the effective area of the smaller diaphragm 22 to balance the opposing fluid pressure forces acting on this diaphragm and thereby render it ineffective.

The fluid under pressure supplied to the chamber 26 acts in an upward direction on the entire effective area of the larger diaphragm 23 to deflect this diaphragm in the direction to first move the valve stem 34 upward to the position in which the upper end thereof abuts the lower face of the valve 39 to close communication between the pressure chamber in the brake cylinder device 9 and atmosphere, and thereafter effect unseating of the valve 39 from the valve seat 43 whereupon fluid under pressure flows from the supply reservoir 5 to the pressure chamber in the brake cylinder device 9 to effect a service brake application.

Fluid under pressure supplied to the brake cylinder device 9 also flows to the chamber 25 above the larger diaphragm 23 via branch passageway 41a and choke 44 where it acts in a downward direction over the effective area of this diaphragm. Consequently, when the pressure in the chamber 25 is increased to substantially the same value as that in the chamber 26, the opposing fluid pressure forces acting on the diaphragm 23 will be balanced whereupon the spring 42 will effect reseating of the valve 39 on its seat 43 to cut off further supply of fluid under pressure to the pressure chamber in the brake cylinder device 9 and the chamber 25.

Since fluid under pressure is supplied to the chamber 25 until it substantially equals the pressure in the chamber 26, it is apparent that this pressure, which is the same as that in the pressure chamber of the brake cylinder device 9, provides for a greater braking force on the loaded vehicle than is provided for an empty vehicle.

*Release of a service application of brakes on a loaded vehicle*

To release a service brake application on a loaded vehicle, the pressure in the brake pipe 2 is increased to its normal charged value to cause the brake control valve device 1 to operate to establish a communication between the brake cylinder pipe 17 and atmosphere.

The chamber 26 in the double diaphragm differential type relay valve device 8 is connected to the chamber 46 in this relay valve device via passageway and corresponding pipe 27, passageway 56, bottom bore 53 in strut cylinder device 10, passageway 55 and pipe and corresponding passageway 47, and the brake cylinder pipe 17 is connected by the corresponding passageway to the chamber 46. Consequently, fluid under pressure will now be vented from the chambers 26 and 46 to atmosphere.

As fluid under pressure is vented from the chambers 26 and 46 in the relay valve device 8, the fluid under pressure present in the chamber 25 in this valve device is rendered effective to deflect the diaphragm 23 downward to move the valve stem 34 to the position shown in FIG. 2 whereupon fluid under pressure is vented from the brake cylinder device 9 to atmosphere in the manner hereinbefore described in detail to cause a release of the brakes.

*Emergency application and release of brakes*

An emergency brake application on both an empty and a loaded vehicle differs from a service brake application only in that when an emergency brake application is effected, fluid under pressure is supplied from both the auxiliary reservoir 3 and the emergency reservoir 4 to, when the vehicle is empty, only the chamber 46 in the relay valve device 8, and, when the vehicle is loaded, to both the chamber 46 and the chamber 26 in this valve device. By supplying fluid under pressure from both the auxiliary reservoir 3 and the emergency reservoir 4, a higher equalization pressure is obtained and, therefore, a higher braking force is transmitted by the brake cylinder device 9 to the brake shoes (not shown) for pressing the brake shoes against the tread surface of the vehicle wheels.

The release of an emergency brake application on either an empty or a loaded vehicle is identical to the release of a service brake application.

DESCRIPTION, FIGS. 3 AND 4

Figure 3:
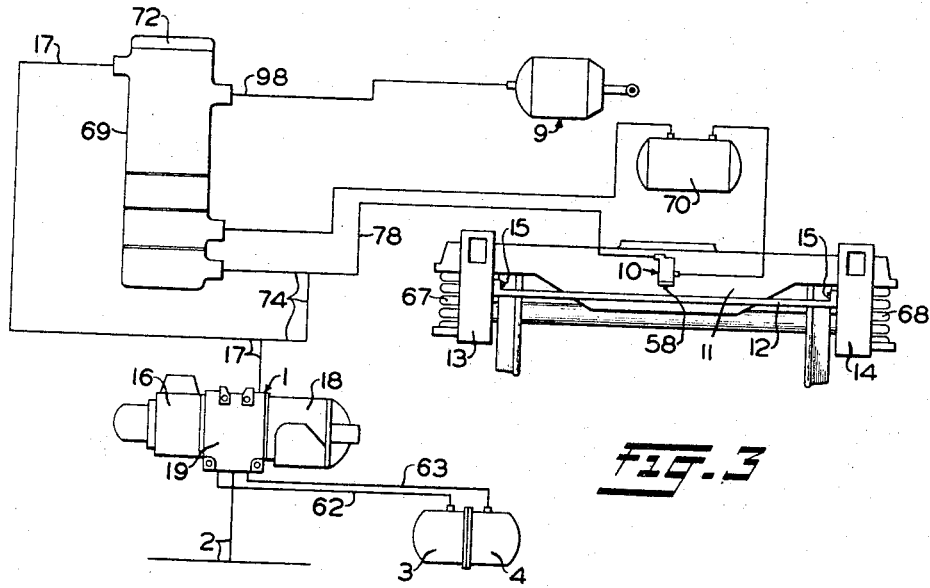
FIG. 3 is a diagrammatic view, in outline, showing an empty and load railway freight car brake equipment constructed in accordance with a second embodiment of the invention.

In FIG. 3 of the drawings, there is shown an empty and load fluid pressure brake equipment constructed in accordance with a second embodiment of the invention. According to this second embodiment of the invention, the empty and load fluid pressure brake equipment shown in FIG. 3 differs from the empty and load fluid pressure brake equipment shown in FIG. 1 only in that the strut cylinder device is mounted in an inverted position, the supply reservoir 5 and check valve device 6 are omitted and the double diaphragm differential type relay valve device 8 is replaced by a triple diaphragm differential type self-lapping relay valve device 69. Accordingly, like reference numerals have been used to designate the structure shown in FIG. 3 which is identical to that shown in FIG. 1. Only such features of the structure and operation of the embodiment of the invention shown in FIG. 3 which differ from that of the embodiment of FIG. 1 will be hereinafter described.

According to the embodiment of the invention disclosed in FIG. 3, the empty and load fluid pressure brake equipment shown in this figure comprises the brake control valve device 1 to which is connected the usual brake pipe 2, auxiliary reservoir 3, emergency reservoir 4 and the above-mentioned relay valve device 69. This relay valve device 69 is in turn connected to the brake cylinder device 9 and to the strut cylinder device 10 which device 10 is mounted in an inverted position substantially midway the truck bolster 11. Strut cylinder device 10 is movable vertically relative to the stop 12 that is secured to and carried on an unsprung part of a railway vehicle truck, such as, for example, the truck side frames 13 and 14 it being noted that the stop 12 shown in FIG. 3 is disposed somewhat below the position of stop 12 shown in FIG. 1. The relay valve device 69 is also connected to a displacement volume reservoir 70 that in turn is connected to the strut cylinder device 10 in a manner hereinafter described in detail.

One end of the brake cylinder pipe 17 is connected to the brake cylinder passageway in the pipe bracket 19 of the brake control valve device 1, as in the first embodiment of the invention shown in FIG. 1 of the drawings, and the opposite end of the brake cylinder pipe 17 is connected by a passageway bearing the same numeral to a supply chamber 71 (FIG. 4) formed in the relay valve device 69 by the cooperative relationship of a cover member 72 and a first casing section 73 of a sectionalized casing of the relay valve device 69, the cover member 72 being secured to the casing section 73 by any suitable means (not shown). Connected to the brake cylinder pipe 17 intermediate the ends thereof is one end of a pipe 74 that has its opposite end connected to a passageway bearing the same numeral which passageway opens into a chamber 75 formed in the relay valve device 69 by the cooperative relationship of a bottom cover member 76 and a second casing section 77 of the sectionalized casing of the relay valve device 69, the bottom cover member 76 being secured to the second casing section 77 by any suitable means (not shown).

Connected to the above-mentioned pipe 74 intermediate the ends thereof is one end of a pipe 78 that has its opposite end connected to the passageway 55 in the body 52 of the strut cylinder device 10.

The sectionalized casing of the triple diaphragm differential type self-lapping relay valve device 69 comprises three casing sections including the two above-mentioned casing sections 73 and 77 and a third casing section 79 disposed between the casing sections 73 and 77 and secured to each of these casing sections by any suitable means (not shown). This relay valve device 69 also comprises three movable abutments or diaphragms 80, 81 and 82; the effective area of the diaphragms 80 and 82 being the same and greater than the effective area of the diaphragm 81.

The outer periphery of the diaphragm 80 is clamped between the casing sections 73 and 79 and cooperates with these casing sections and the diaphragm 81 to form within the relay valve device 69 and on opposite sides of the diaphragm 80 a first pair of chambers 83 and 84, the latter being open to atmosphere via a short passageway 85 formed in the casing section 79.

The casing section 73 of the above-mentioned sectionalized casing of the relay valve device 69 is provided with a bore 86 that at its upper end opens into a coaxial counterbore 87 that in turn opens into the hereinbefore-mentioned chamber 71. The opposite or lower end of the bore 86 opens into a second coaxial counterbore 88 that in turn opens into the chamber 83. The casing section 73 is provided intermediate the ends of the bore 86 with an annular chamber 89 which is open to atmosphere via a passageway 90 formed in the casing section 73 and a choke 91 disposed in this passageway it being understood that the size of this choke 91 is such as to provide for the same rate of release to fluid under pressure from the pressure chamber of the brake cylinder device 9 as is obtained in standard AB freight car brake equipment.

Slidably mounted in the bore 86 is a valve stem 92 having intermediate its ends a collar 93 below which is a screw-threaded portion of reduced diameter which extends through the diaphragm 80 and receives in screw-threaded engagement therewith a combined diaphragm follower plate and nut 94 whereby the diaphragm 80 is operatively connected to the valve stem 92.

The wall of the bore 86 in the casing section 73 is provided with two identical spaced-apart peripheral annular grooves in each of which is disposed an O-ring 95 in sealing surrounding relation to the valve stem 92 to prevent leakage of fluid under pressure between the periphery of the valve stem and the wall of the bore 86, and from the chamber 83 and counterbore 87 to the atmospheric chamber 89.

Figure 4:
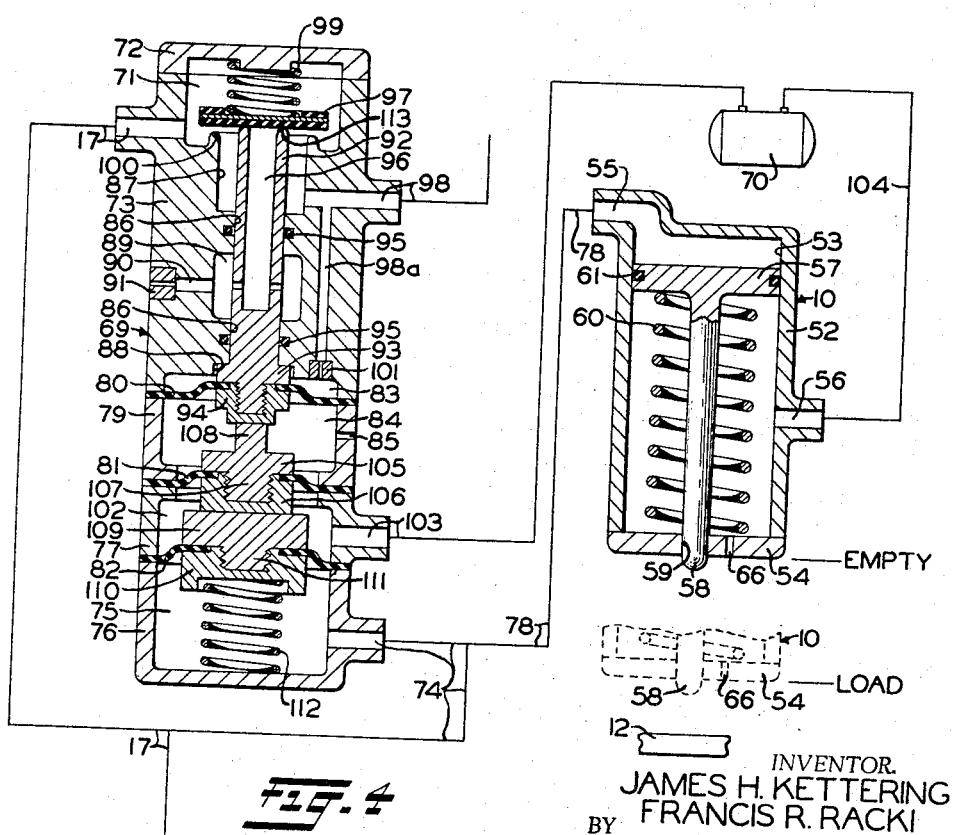
FIG. 4 is a vertical cross-sectional view, at an enlarged scale, of a differential type relay valve device and a strut cylinder device of FIG. 3 showing the structural details of these valve devices.

The valve stem 92 is provided above the collar 93 thereon with a crossbore which, as shown in FIG. 4 illustrating the relative positions of the parts of the triple diaphragm self-lapping relay valve device 69 in the release position, is so located that the interior of the counterbore 87 may be open to atmosphere via a passageway 96 extending from the upper end of the valve stem 92 longitudinally therethrough to below the location thereon of the crossbore and thence via the crossbore, the chamber 89, passageway 90 and choke 91.

A flat disc valve 97 is disposed in the chamber 71 to control communication between the chamber 71 and the interior of the counterbore 87 at the wall surface of which opens one end of a passageway 98 that extends through the casing section 73 and is connected by a pipe bearing the same numeral to the brake cylinder device 9.

A spring 99, interposed between the valve 97 and the cover member 72, urges the valve 97 downward toward an annular valve seat 100 formed at the upper end of the counterbore 87.

The above-mentioned passageway 98 has a branch passageway 98a opening into the chamber 83 via a choke 101 which controls the rate of flow of fluid under pressure to and from the chamber 83.

The outer periphery of the smaller diagram 81 is clamped between the casing sections 79 and 77 which cooperate with this diaphragm 81 and the diaphragms 80 and 82 to form on one side of the diaphragm 81 the hereinbefore-mentioned atmospheric chamber 84 and on the opposite side a chamber 102 which is connected by a passageway and corresponding pipe 103 to the hereinbefore-mentioned displacement volume reservoir 70 that opposite side a chamber 102 which is connected by a passageway and corresponding pipe 103 to the hereinbefore-mentioned displacement volume reservoir 70 that in turn is connected by a pipe 104 to the passageway 56 in the body 52 of the strut cylinder device 10. The inner periphery of the smaller diaphragm 81 is clamped between a diaphragm follower 105 and a nut 106 that has screw-threaded engagement with a screw-threaded stem 107 integral with the follower 105 and extending from the lower side thereof through the diaphragm 81. The upper side of the diaphragm follower 105 is provided with a non-screw-threaded stem 108 that is coaxial with the hereinbefore-mentioned valve stem 92 and is normally biased against the combined diaphragm follower plate and nut 94 in a manner hereinafter made apparent.

The diaphragm 82 has its outer periphery clamped between the casing section 77 and the bottom cover member 76 and its inner periphery clamped between a diaphragm follower 109 and a combined spring seat and nut 110 that has screw-threaded engagement with a screw-threaded stem 111 integral with the follower 109 and extending from the lower side thereof through the diaphragm 82.

Disposed in the chamber 75 and interposed between the combined spring seat and nut 110 and the bottom cover member 76 is an inshot spring 112 which is effective to normally bias the diaphragms 80, 81 and 82, the valve stem 92 and the valve 97 to the position in which they are shown in FIG. 4 of the drawings in which position the collar 93 abuts the upper end of the counterbore 88 and the valve 97 is unseated from the supply valve seat 100 and seated on an annular exhaust valve seat 113 formed at the upper end of the valve stem 92 and in surrounding relation to the upper end of the passageway 96 in the stem 92 to close communication between the pressure chamber in the brake cylinder device 9 and atmosphere. The force of the spring 112 is exerted in an upward direction on the diaphragm stack comprising the diaphragms 80, 81 and 82. The strength of the spring 112 is such that the upward force exerted thereby, together with the fluid pressure force acting in an upward direction on the smaller diaphragm 81 as the result of the supply of fluid under pressure to the chambers 75 and 102, in response to a minimum reduction of pressure in the brake pipe 2 effected while the vehicle is empty, requires a pressure of such as, for example ten pounds per square inch, in the pressure chamber of the brake cylinder device 9 and the chamber 83 above the diaphragm 80 in order to move the diaphragm stack and the valve stem 92 downward far enough for the spring 99 to effect seating of the valve 97 on the supply valve seat 100 and thereby cut off further supply of fluid under pressure from the brake cylinder pipe 17 to the pressure chamber of the brake cylinder device 9 and the chamber 83. In other words, whenever a minimum brake pipe reduction is made while the vehicle is empty, a pressure of at least, for example, ten pounds per square inch, will be obtained in the pressure chamber of the brake cylinder device 9 and the chamber 83 above the diaphragm 80.

OPERATION, FIGS. 3 AND 4

Initial charging

Fluid under pressure supplied to the brake pipe 2 shown in FIG. 3 in the manner described in connection with the previous embodiment of the invention effects charging of the brake equipment shown in FIG. 3 in the same manner as hereinbefore described for the brake equipment shown in FIG. 1 except the supply reservoir 5 shown in FIG. 1 is omited in the equipment shown in FIG. 3.

At this time, the chamber 102 in the relay valve device 69 is connected to the displacement volume reservoir 70 by the passageway and corresponding pipe 103, and this reservoir is open to atmosphere via pipe 104, passageway 56, that portion of the bottom bore 53 in the body 52 of strut cylinder device 10 below the piston 57 and port 66 in cover member 54.

Also, the chamber 75 in the relay valve device 69 is open to atmosphere via pipe and passageway 74, the brake cylinder pipe 17 and the service portion 16 of the brake control valve device 1 since the service slide valve of the service portion 16 is now in its release position in which it opens the brake cylinder pipe 17 to atmosphere.

Furthermore, the chamber 84 in the relay valve device 69 is constantly open to atmosphere via the passageway 85.

With the chambers 84, 102 and 75 in the relay valve device 69 all open to atmosphere, the spring 112 is effective to deflect the diaphragms 80, 81 and 82 to the position shown in FIG. 4 and thereby move the valve stem 92 and valve 97 to the position shown in FIG. 4 in which position the valve 97 is unseated from the supply valve seat 100 and is seated on the exhaust valve seat 113.

While the valve 97 is unseated from the supply valve seat 100, the pressure chamber in the brake cylinder device 9 is open to atmosphere via the pipe and corresponding passageway 98 counter bore 87, chamber 71, passageway and corresponding pipe 17 and the service portion 16 of the brake control valve device 1. Since the chamber 83 above the diaphragm 80 is connected to the passageway 98 via the choke 101 and branch passageway 98a, this chamber 83 is likewise open to atmosphere.

Service application of the brakes on an empty vehicle

A service application of the brakes can be effected by reducing the pressure in the brake pipe 2 to cause the brake control valve device 1 to effect the supply of fluid under pressure to the brake cylinder pipe 17 in the manner hereinbefore described. Fluid under pressure supplied to the brake cylinder pipe 17 will flow to the pressure chamber in the brake cylinder device 9 via passageway 17, chamber 71, past now open valve 97, counterbore 87 and passageway and corresponding pipe 98. Some of the fluid under pressure thus supplied to the passageway 98 flows therefrom to the chamber 83 above the diaphragm 80 via the branch passageway 98a and the choke 101.

Some of the fluid under pressure supplied to the brake cylinder pipe 17 by operation of the brake control valve device 1 will flow to the chamber 75 below the diaphragm 82 of the relay valve device 69 via the pipe and passageway 74. Some of the fluid under pressure supplied to the pipe 74 will flow therefrom to the upper face of the strut piston 57 (FIG. 4) via the pipe 78 and passageway 55.

Assuming that the vehicle is empty, the truck springs 67 and 68 (FIG. 3) are not appreciably deflected. Consequently, the stop 12 and strut cylinder device 10 will occupy the relative positions in which they are shown in full lines in FIG. 4. Therefore, the fluid under pressure supplied to the upper face of the strut piston 57 of the strut cylinder device 10 will move this piston 57 and the piston rod 58 downward against the yielding resistance of the spring 60 until the lower end of the piston rod 58 contacts the upper side of the stop 12. In this position of the piston 57 the O-ring 61 carried thereby forms a seal with the wall surface of the bottom bore 53 below the location at which the passageway 56 opens at this wall surface. Consequently, the fluid under pressure supplied to the upper face of the piston 57 flows to the displacement volume reservoir 70 via the passageway 56 and pipe 104 and from the reservoir 70 to the chamber 102 between the diaphragms 81 and 82 of the relay valve device 69 via the pipe and corresponding passageway 103.

The simultaneous supply of fluid under pressure to the chambers 102 and 75 acts on the opposite sides of the effective area of the diaphragm 82 to balance the opposing fluid pressure forces acting on this diaphragm and thereby renders it ineffective.

The fluid under pressure supplied to the chamber 102 acts in an upward direction on the entire effective area of the smaller diaphragm 81. Therefore, this fluid pressure force, together with the force of spring 112, is effective to bias the diaphragm stack comprising the diaphragms 80, 81 and 82 and the valve stem 92 to the position shown in FIG. 4 in which the collar 93 on the stem 92 abuts the upper end of the counterbore 88.

In view of the above, it is apparent that the fluid under pressure supplied to the pressure chamber of the brake cylinder device 9 and the chamber 83 above the larger diaphragm 80 by operation of the brake control valve devise 1 must increase the pressure in these chambers until the pressure in the chamber 83 and acting over the effective area of the larger diaphragm 80 establishes a fluid pressure force acting in a downward direction that substantially balances the combined fluid pressure force acting on the diaphragm 81 and the force of the spring 112, which forces act in an upward direction, at which time the spring 99 will be rendered effective to move the diaphragm stack and the valve stem 92 downward to seat the valve 97 on the supply valve seat 100 to cut off flow of fluid under pressure from the brake cylinder pipe 17 to the pressure chamber in the brake cylinder device 9 and the chamber 83 above the larger diaphragm 80. From the foregoing, it is apparent that the pressure supplied to the pressure chamber of the brake cylinder device 9 and to the chamber 83 is less than the pressure supplied to the chambers 75 and 102 in inverse ratio to the areas of the diaphragms 80 and 81 and also the strength of the spring 112. It will be understood, however, that this pressure in the pressure chamber of the brake cylinder device 9 always provides an adequate braking force for an empty vehicle even when a minimum brake pipe reduction is effected in the brake pipe 2. In other words, the spring 112 insures that at least a chosen pressure, such as for example, ten pounds per square inch, is always obtained in the pressure chamber of the brake cylinder device 9 when a minimum brake pipe reduction is effected.

*Release of a service application on an empty vehicle*

When it is desired to effect a release of a service brake application, the pressure in the brake pipe 2 will be increased in the usual manner whereupon the service portion 16 of the brake control valve device 1 will operate in the manner hereinbefore described to establish a communication between the brake cylinder pipe 17 and atmosphere.

Since the brake cylinder pipe 17 is now open to atmosphere and this pipe is connected to the chamber 75 in the relay valve device 69 via the pipe and corresponding passageway 74, fluid under pressure will be vented from the chamber 75 to atmosphere. Fluid under pressure will also be vented from the chamber 102 in the relay valve device 69 via the passageway and corresponding pipe 103, displacement volume reservoir 70, pipe 104, passageway 56, bottom bore 53, passageway 55, pipes 78, 74 and 17, and the brake control valve device 1.

As fluid under pressure is simultaneously vented from the chambers 102 and 75, as just described, the fluid under pressure in the chamber 83 is rendered effective to deflect the diaphragm stack comprising diaphragms 80, 81 and 82 downward and thereby move the valve stem 92 downward so that the exhaust valve seat 113 on the upper end thereof is moved away from the lower side of the valve 97 which is biased against the supply valve seat 100 at this time by the spring 99. When the exhaust valve seat 113 is thus moved away from the lower side of the valve 97, fluid under pressure will be vented from the pressure chamber in the brake cylinder device 9 to atmosphere via pipe and passageway 98, counterbore 87, passageway 96 and the crossbore in the valve stem 92, chamber 89, passageway 90 and choke 91 at a rate controlled by the size of this choke 91, the size of which, as hereinbefore stated, provides for the release of fluid under pressure from the brake cylinder device 9 at the same rate as is obtained in the standard single capacity brake equipment that includes the well-known AB brake control valve device.

Since the chamber 83 is connected to the passageway 98 via the branch pipe 98a and choke 101, fluid under pressure will be vented from the chamber 83 to atmosphere simultaneously as fluid under pressure is vented from the brake cylinder device 9 to atmosphere.

Fluid under pressure will be vented from the chambers 75, 102 and 83 in the relay valve device 69 to atmosphere in the manner explained above until the fluid pressure force acting downward on the diaphragm stack comprising the diaphragms 80, 81 and 82 is reduced to a value substantially equal to the force of the spring 112 acting in an upward direction on this diaphragm stack. As the downwardly acting fluid pressure force acting on the diaphragm stack is reduced to a value less than the force of the spring 112 acting upward on this stack due to the continued reduction of pressure in the chambers 83, 102 and 75 as the result of venting fluid under pressure therefrom to atmosphere, the spring 112 is rendered effective to move the diaphragm stack and the stem 92 upward until first the exhaust valve seat 113 is moved into contact with the lower side of the valve 97 to cut off further venting of fluid under pressure from the brake cylinder device 9 and chamber 83 to atmosphere via the choke 91.

As the pressure in the chambers 75 and 102 is further reduced by flow therefrom to atmosphere, the spring 112 will continue to deflect the diaphragm stack upward to move the valve stem 92 upward and thereby unseat valve 97 from the supply valve seat 100. When the valve 97 is thus unseated, the remaining fluid under pressure in the brake cylinder device 9 and the chamber 83 flows to atmosphere past the unseated valve 97, and thence via the chamber 71, passageway and corresponding pipe 17 and the service portion 16 of the brake control valve device 1 thereby completely releasing the brakes on the vehicle.

As fluid under pressure is vented from the chamber 75 in the relay valve device 89, it is likewise vented from the top face of the strut piston 57 whereupon the spring 60 is rendered effective to move the piston 57 and piston rod 58 upward so that the lower end of the piston rod 58 is moved upward out of contact with the stop 12. When the piston 57 is thus moved upward to a position in which the O-ring 61 carried thereby forms a seal with the wall surface of the bottom bore 53 just above the location at which the passageway 56 opens at this wall surface, the remaining fluid under pressure present in the chamber 102 and displacement volume reservoir 70 connected thereto by the pipe and corresponding passageway 103, will be vented to atmosphere via pipe 104, passageway 56, that portion of the bottom bore 53 below the piston 57 and the port 66 in the cover member 54. The fluid under pressure remaining in that portion of the bottom bore 53 above the piston 57 is now vented to atmosphere via passageway 55, pipes 78, 74 and 17, and the service portion 16 of the brake control valve device 1. Likewise, the fluid under pressure remaining in the chamber 75 is vented to atmosphere via pipes 74 and 17 and the service portion 16 of the brake control valve device 1.

*Service application of the brakes on a loaded vehicle*

Let it be supposed that the brake equipment shown in FIG. 3 has been charged in the manner hereinbefore described and that the vehicle is fully loaded.

The load transmitted in the manner hereinbefore described to the bolster 11 is effective to compress the springs 67 and 68 shown in FIG. 3 so that the bolster 11 and the strut cylinder device 10 carried thereby together with the other devices constituting the brake equipment shown in FIG. 3 are moved downward toward the stop 12 until strut cylinder device 10 occupies the position relative to the stop 12 indicated by broken lines in FIG. 4. Consequently, the distance between the bottom of the piston rod 58 and the top side of the stop 12 will be such, due to the compression of the truck springs 67 and 68, that when a service brake application is effected in the manner hereinbefore described to cause the strut piston 57 to move downward, as viewed in FIG. 4, until the lower end of piston rod 58 strikes the top side of the stop 12, this piston will not be moved to the position in which the O-ring 61 carried thereby makes a seal with the wall surface of the bottom bore 53 below the opening of the passageway 56 at this wall surface. Therefore, the fluid under pressure supplied to the top face of the strut piston 57 cannot flow to the displacement volume reservoir 70 via the passageway 56 and pipe 104 and thence from the reservoir 70 to the chamber 102 in the relay valve device 69 via the pipe and corresponding passageway 103.

When a service brake application is effected in the manner hereinbefore described, the brake control valve device 1 operates to effect the supply of fluid under pressure from the auxiliary reservoir 3 to the brake cylinder pipe 17 from whence it flows to the pressure chamber in the brake cylinder device 9 via the passageway 17, chamber 71, past the unseated valve 97, counterbore 87 and passageway and corresponding pipe 98. Some of the fluid under pressure thus supplied by the brake control valve device 1 to the brake cylinder pipe 17 flows therefrom to the chamber 75 in the relay valve device 69 and to the upper face of the strut piston 57.

Fluid under pressure supplied to the upper face of the strut piston 57 in the manner just described is effective to move this piston and the piston rod 58 downward against the yielding resistance of the spring 60.

The strut piston 57 and piston rod 58 will thus be moved downward until the lower end of the piston rod is moved into contact with the stop 12 carried by the truck side frames 13 and 14.

When the piston 57 is moved downward to the position in which the lower end of the piston rod 58 is in contact with the stop 12 while the strut cylinder device 10 occupies the position relative to the stop 12 indicated by broken lines in FIG. 4, the O-ring 61 carried by the piston 57 is in a position in which it makes a seal with the wall surface of the bottom bore 53 above the location at which the passageway 56 opens at this wall surface. Therefore, the fluid under pressure supplied from the brake cylinder pipe 17 to the upper face of the piston 57 via pipes 74 and 78, the passageway 55 and the bottom bore 53 cannot flow to the chamber 102 above the diaphragm 82 in the relay valve device 69 via the passageway 56, pipe 104, displacement volume reservoir 70 and pipe and corresponding passageway 103. Consequently, the chamber 102 remains open to atmosphere via passageway and corresponding pipe 103, reservoir 70, pipe 104, passageway 56, that portion of bottom bore 53 that is below the strut piston 57 and port 66 in cover member 54.

The effective area of the diaphragms 80 and 82 is the same and the lower side of the diaphragm 82 is subject to the force of the spring 112 and the fluid under pressure supplied to the chamber 75 from the brake cylinder pipe 17. The upper side of the diaphragm 80 is subject only to the fluid under pressure supplied to the chamber 83 from the brake cylinder pipe 17. The spring 112, therefore, is effective to maintain the diaphragm stack and the valve stem 92 in the position shown in FIG. 4 in which the valve 97 is unseated from the supply valve seat 100 and seated on the exhaust valve seat 113. Accordingly, fluid under pressure will flow from the auxiliary reservoir 3 to the pressure chamber in the brake cylinder device 9, and to the chambers 75 and 83 in the relay valve device 69 until the pressure in the auxiliary reservoir 3 and acting on one side of the service piston (not shown) of the service portion 16 of the brake control valve device 1 is reduced slightly below the brake pipe pressure acting on the opposite side of this service piston at which time this service piston will move the service slide valve of the service portion 16 to its lap position to cut off further flow of fluid under pressure from the auxiliary reservoir 3 to the pressure chamber in the brake cylinder device 9 and the chambers 75 and 83 in the relay valve device 69.

From the foregoing it is apparent that the same pressure is supplied to the pressure chamber in the brake cylinder device 9 as is supplied to the brake cylinder pipe 17 and chambers 75 and 83 in the relay valve device 69 by the brake control valve device 1. It will be understood that this pressure is greater than the pressure supplied to the pressure chamber of the brake cylinder device 9 when the vehicle is empty and therefore, provides for a greater braking force on the loaded vehicle than is provided for an empty vehicle.

*Release of a service application of brakes on a loaded vehicle*

To release a service brake application on a loaded vehicle, the pressure in the brake pipe 2 is increased to its normal charged value to cause the service portion 16 of the brake control valve device 1 to operate to establish a communication between the brake cylinder pipe 17 and atmosphere as in the first embodiment of the invention.

The pressure chamber in the brake cylinder device 9 is connected to the brake cylinder pipe 17 via the pipe and corresponding passageway 98, counterbore 87, chamber 71 and passageway 17; the chamber 83 in the relay valve device 69 is connected to the passageway 98 via the choke 101 and branch passageway 98a; the chamber 75 in the relay valve device 69 is connected to the brake cylinder pipe 17 via the passageway and corresponding pipe 74; and that portion of the bottom bore 53 in the body 52 of strut cylinder device 10 above the strut piston 57 is connected to the pipe 74 via the passageway 55 and pipe 78. Consequently, fluid under pressure will now be vented from the pressure chamber in the brake cylinder device 9, the chambers 83 and 75 in the relay valve device 69 and the upper portion of the bottom bore 53 above the piston 57 to atmosphere. This venting of fluid under pressure from the pressure chamber of the brake cylinder device 9 causes a release of the brake on the loaded vehicle.

As in the first embodiment of the invention, when an emergency brake application is effected, fluid under pressure from both the auxiliary reservoir 3 and emergency reservoir 4 is supplied to the brake cylinder pipe 17 and thence to the pressure chamber of the brake cylinder device 9 to give a higher equalization pressure and therefore, a higher braking force than is obtained when a service brake application is effected. A release of an emergency brake application is effected in the same manner as a release of a service brake application.

Having now described the invention, what we claim as new and desire to secure by Letters Patent, is:

1. In an empty and load fluid pressure brake equipment for a vehicle having a sprung part and an unsprung part, the combination of:
   (a) a brake pipe normally charged with fluid under pressure,
   (b) a reservoir normally charged to the pressure in said brake pipe,
   (c) fluid pressure operated braking means for effecting a brake application,
   (d) a fluid pressure operated relay valve means having a plurality of operating pressure chambers, said relay valve means being operable to establish one degree of fluid pressure in said fluid pressure operated braking means in response to the supply of fluid under pressure to only one of said pressure chambers and operable to establish a different degree of fluid pressure in said fluid pressure operated braking means in response to the supply of fluid under pressure concurrently to said one chamber and to another of said chambers,
   (e) stop means carried by one of said sprung and unsprung parts of the vehicle,
   (f) fluid pressure operated load measuring means carried by the other of said sprung and unsprung parts of the vehicle and comprising:
       (i) piston valve means, and
       (ii) a valve stem operably connected to said piston valve means and movable thereby into abutting relationship with said stop means when said piston valve means is subject to fluid under pressure, said piston valve means selectively causing the supply of fluid under pressure acting on said piston valve means to said another chamber of said relay valve means depending upon the relative position of said stem to said stop means as determined by the degree of load carried by the vehicle, and
   (g) a fluid pressure responsive brake control valve device operative upon a reduction in the pressure in said brake pipe to effect the supply of fluid under pressure from said reservoir to said one chamber of said relay valve means and to said another chamber of the relay valve means subject to control by the piston valve means, whereby said relay valve means operates selectively to establish different degrees of fluid pressure in the braking means dependent on the load carried by the vehicle.

2. In an empty and load fluid pressure brake equipment for a vehicle having a sprung part and an unsprung part, the combination disclosed in claim 1 wherein the stop means is carried on the unsprung part of the vehicle and the fluid pressure operated load measuring means is carried on the sprung part of the vehicle.

3. In an empty and load fluid pressure brake equipment for a vehicle having a sprung part and an unsprung part, the combination disclosed in claim 1 wherein the fluid pressure operated relay valve means is characterized by a pair of spaced-apart movable abutments of unequal effective area, and in that said one of said plurality of operating pressure chambers is disposed at one side of one of said abutments, and the said another of said plurality of pressure chambers is disposed between said pair of movable abutments.

4. In an empty and load fluid pressure brake equipment for a vehicle having a sprung part and an unsprung part, the combination disclosed in claim 1 wherein the fluid pressure operated relay valve means is characterized by three coaxially arranged spaced-apart movable abutments, the outer two abutments each having the same effective area which exceeds the effective area of the intermediate third one of said movable abutments, and in that said one of said plurality of operating pressure chambers is disposed at one side of one of said two outer abutments, and the said another of said pressure chambers is between said one of said two outer abutments and said intermediate third one of said abutments.

5. In an empty and load fluid pressure brake equipment for a vehicle having a sprung part and an unsprung part, the combination disclosed in claim 4 wherein the fluid pressure operated relay means is characterized by a resilient means disposed at said one side of said one of said two outer abutments to exert a chosen force thereon in the same direction as fluid under pressure supplied to said one of said plurality of operating pressure chambers.

References Cited
UNITED STATES PATENTS

| 2,173,928 | 9/1939 | Borde et al. | 303—22 |
| 3,300,255 | 1/1967 | Racki | 303—22 |

DUANE A. REGER, *Primary Examiner.*